United States Patent
Klein et al.

(10) Patent No.: US 7,038,716 B2
(45) Date of Patent: May 2, 2006

(54) MOBILE DEVICE EQUIPPED WITH DIGITAL IMAGE SENSOR

(75) Inventors: Vernon Lawrence Klein, Pleasanton, CA (US); John Mario Monti, Los Gatos, CA (US)

(73) Assignee: PIXIM, Inc., Mountain View, CA (US)

( * ) Notice: Subject to any disclaimer, the term of this patent is extended or adjusted under 35 U.S.C. 154(b) by 909 days.

(21) Appl. No.: 09/798,815

(22) Filed: Mar. 1, 2001

(65) Prior Publication Data

US 2001/0009437 A1   Jul. 26, 2001

Related U.S. Application Data (63) Continuation-in-part of application No. 09/365,054, filed on Jul. 30, 1999, now abandoned, and a continuation-in-part of application No. 09/567,786, filed on May 9, 2000, and a continuation-in-part of application No. 09/567,638, filed on May 9, 2000, now abandoned.

(51) Int. Cl.
*H04N 5/232* (2006.01)
*H04N 5/225* (2006.01)
*G06K 9/38* (2006.01)
*H04M 1/00* (2006.01)

(52) U.S. Cl. .......... 348/211.3; 348/373; 382/237; 455/556.1; 455/575.1

(58) Field of Classification Search .......... 348/207.1, 348/211.2, 211.1, 211.14, 211.99, 211.3, 348/376, 375, 373, 552; 455/556.1, 556.2, 455/575.3; 382/237
See application file for complete search history.

(56) References Cited

U.S. PATENT DOCUMENTS

| | | | |
|---|---|---|---|
| 5,461,425 A | 10/1995 | Fowler et al. | 348/294 |
| 5,493,335 A * | 2/1996 | Parulski et al. | 348/231.6 |
| 5,550,754 A | 8/1996 | McNelley et al. | 364/514 |
| 5,734,155 A | 3/1998 | Rostoker | 250/208.1 |
| 5,764,286 A * | 6/1998 | Kawamura et al. | 348/231.6 |
| 5,801,657 A | 9/1998 | Fowler et al. | 341/155 |
| 5,806,005 A | 9/1998 | Hull et al. | 455/566 |
| 5,943,603 A * | 8/1999 | Parulski et al. | 725/133 |
| 5,987,136 A | 11/1999 | Schipper et al. | 380/25 |
| 6,106,457 A | 8/2000 | Perkins et al. | 600/175 |
| 6,111,977 A | 8/2000 | Scott et al. | 382/124 |
| 6,122,526 A * | 9/2000 | Parulski et al. | 455/556.1 |
| 6,141,037 A | 10/2000 | Upton et al. | 348/65 |
| 6,147,598 A | 11/2000 | Murphy et al. | 340/426 |

(Continued)

FOREIGN PATENT DOCUMENTS

| | | |
|---|---|---|
| EP | 1 049 326 | 11/2000 |
| WO | WO 00/07357 | 2/2000 |
| WO | WO 00/75859 | 12/2000 |

OTHER PUBLICATIONS http://www.spooktech.com/bodyworn/cellphonecamera.shtml.

(Continued)

*Primary Examiner*—Thai Tran
*Assistant Examiner*—John M. Villecco
(74) *Attorney, Agent, or Firm*—Patent Law Group LLP (57) ABSTRACT

A mobile device with the capability of imaging a natural scene or a document and transmitting the image over a network is presented. The mobile device includes a digital pixel sensor so that over-sampling of an image of a target is possible. The target may be a scene or a document and output images can be set for the appropriate target.

15 Claims, 9 Drawing Sheets

U.S. PATENT DOCUMENTS

| | | | |
|---|---|---|---|
| 6,181,954 B1 | 1/2001 | Monroe et al. | 455/557 |
| 6,249,316 B1* | 6/2001 | Anderson | 348/333.05 |
| 6,466,263 B1* | 10/2002 | Suzuki | 348/220.1 |
| 6,535,243 B1* | 3/2003 | Tullis | 348/207.1 |
| 6,549,674 B1* | 4/2003 | Chui et al. | 382/240 |
| 6,646,677 B1* | 11/2003 | Noro et al. | 348/156 |
| 6,657,654 B1* | 12/2003 | Narayanaswami | 348/14.04 |
| 6,690,417 B1* | 2/2004 | Yoshida et al. | 348/231.1 |
| 6,785,423 B1* | 8/2004 | Joshi et al. | 382/235 |
| 2004/0046867 A1* | 3/2004 | Silverbrook et al. | 348/207.2 |

OTHER PUBLICATIONS http://coverage.cnet.com/content/Gadgets/Guides/SpyKit/ss01.html.

http://www.eetasia.com/ART_8800074181_499481, 499493.HTM.

http://www.nwfusion.com/news/2000/0705cameraphone.html.

* cited by examiner

MOBILE DEVICE EQUIPPED WITH DIGITAL IMAGE SENSOR

CROSS-REFERENCE TO RELATED APPLICATIONS

This application is related to U.S. Pat. Nos. 5,461,425 and 5,801,657 and U.S. patent application Ser. No. 09/274,202, filed on Mar. 22, 1999, now U.S. Pat. No. 6,362,767, issued on Mar. 26, 2002, each of which is hereby incorporated by reference. This application is a continuation-in-part of U.S. application Ser. No. 09/365,054 filed on Jul. 30, 1999, now abandoned and U.S. application Ser. Nos. 09/567,786 and 09/567,638, now abandoned, both filed May 9, 2000.

BACKGROUND

1. Field of the Invention

The present invention relates to digital acquisition and transmission of images and, more particularly, to a mobile device having a digital image sensor for capture and transmission of images, wherein the digital image sensor is preferably a digital pixel sensor (DPS).

2. Discussion of Related Art

The Internet is a rapidly growing communication network of interconnected computers around the world. Together, the millions of connected computers form a vast repository of hyperlinked information that is readily accessible by any of the connected computers from anywhere and anytime. To provide mobility and portability of the Internet, recent technologies have been introduced to make it possible for wireless mobile devices to communicate, via wireless data networks, with the computers on the Internet. Thus people on the go are able to be in communication with devices on the Internet as well as other people.

The most common information sharing paradigm is, as of today, a desktop computer coupled to the Internet. The desktop computer is equipped with one or more input devices that allow a user to generate information to be uploaded for sharing or distribution over the Internet. This paradigm may remain useful for a considerable number of applications and users, but there has been a growing need for a mobile paradigm in which the Internet can be accessed by mobile devices from anywhere at any time. Likewise the mobile devices are desired to provide information to be shared or distributed over the Internet.

Examples of mobile devices include cellular phones, personal digital assistants (PDAs), palm-sized computers, or lap-top computers. Currently, the kind of information that may be conveniently transmitted to and from such mobile platforms is voice and text information. Image exchange with mobile devices is usually more challenging. This is because image acquisition from mobile devices possesses some inherent problems. A simple integration of a CCD sensor or a conventional CMOS sensor with a mobile device provides images that often turn out too poor to have practical uses. One of the reasons is that a user of a mobile device moves around and experiences dynamically changed lighting conditions, for example, from sunshine to dark. Unless sophisticated and expensive optical designs are equipped, most of the CCD sensors or CMOS sensors in a mobile device are handicapped to the dynamics in the "mobile image acquisitions".

In addition, many users of the mobile image acquisitions desire to rapidly capture images to record scenes of particular interests. Preferably, the mobile device itself does not have to store each of the images output from an image sensor therein to reduce the memory requirement therefor, hence the cost thereof. Captured images are desired to be transported off the mobile device as soon as the sensor can possibly readout the images, thus requiring a higher speed clocking signal to synchronize the operations of the sensor. Generally, the higher speed the clocking signal is, the higher power consumption the sensor would have, indeed an undesirable feature for a mobile device that operates on a battery of limited capacity.

Therefore, there is a great need for mobile devices equipped with image sensors that not only cope with the dynamically changing lighting conditions but also operate at a lower speed clocking signal while maintaining a high speed readout from the image sensor.

SUMMARY

In accordance with the present invention, a mobile communications device having a digital image sensor is disclosed. The mobile communications device can be any device that is capable of communicating with another device over a network. Examples of the mobile communications device may include, but not be limited to, cellular phones, personal digital assistants (PDAs), palm-sized computers, or laptop computers. Mobile devices can be coupled to a network wirelessly, optically, or directly (e.g., through a cable). The mobile communications device may be coupled to the Internet, a local area network (LAN), or to other mobile devices.

According to one aspect of the present invention, the mobile communications device is equipped with an imaging system that comprises a digital pixel sensor (DPS). One of the features of a DPS sensor is the ability of multiple readouts of image data during a predefined snapshot. As a result, images from the DPS sensor in the imaging system have wider dynamic ranges than the traditional CCD or CMOS image sensors.

According to another aspect of the present invention, a switch mechanism is integrated in the mobile device equipped with the DPS sensor. The switch mechanism can be set by a user of the mobile device to select image resolutions for a particular target. In one embodiment, two different image settings may be selected, one for high spatial resolution with low intensity resolution and the other for low spatial resolution with high intensity resolution.

The advantages of the invention are numerous. Different embodiments or implementations as a method, a system and an apparatus may yield one or more of the following advantages. One advantage of the invention is that now a mobile device equipped with the DPS image sensor can take pictures in very dynamically changed lighting conditions. Another advantage is the low power consumption of the unique sensor architecture so that the mobile device would not experience significant power drainage from the sensor. Still another advantage of the invention is that the images can be read out in a desired spatial resolution or a desired intensity resolution depending on the nature of the imaging target.

Other objects, benefits and advantages together with the foregoing are attained in the exercise of the invention in the following description and resulting in the embodiment illustrated in the accompanying drawings.

BRIEF DESCRIPTION OF THE FIGURES

These and other features, aspects, and advantages of the present invention will become better understood with regard to the following description, appended claims, and accompanying drawings where:

DETAILED DESCRIPTION OF THE INVENTION

In accordance with the present invention, a mobile device capable of capturing an image based on a digital pixel sensor (DPS) and transmitting an image to a data network is described. Examples of mobile devices include wireless telephones, personal data assistants (PDAs), palm computing devices, portable computers, or other non-stationary computing devices. In some embodiments, the mobile device is capable of receiving and displaying an image as well. Additionally, the mobile device may operate a microbrowser and/or an operating system allowing access to the Internet (e.g., Microsoft Windows CE) to include viewing/browsing applications and also transmission/reception of the images via Internet.

In the following detailed description of the invention, some specific details are set forth to provide a thorough understanding of the presently preferred embodiment of the invention. However, it should be apparent to those skilled in the art that the invention may be practiced in embodiments that do not use the specific details set forth herein. Well known methods, procedures, components, and circuitry have not been described in detail to avoid unnecessarily obscuring the invention. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams, if there are any, representing one or more embodiments of the invention do not inherently indicate any particular order nor imply any limitations in the invention.

Figure 1:
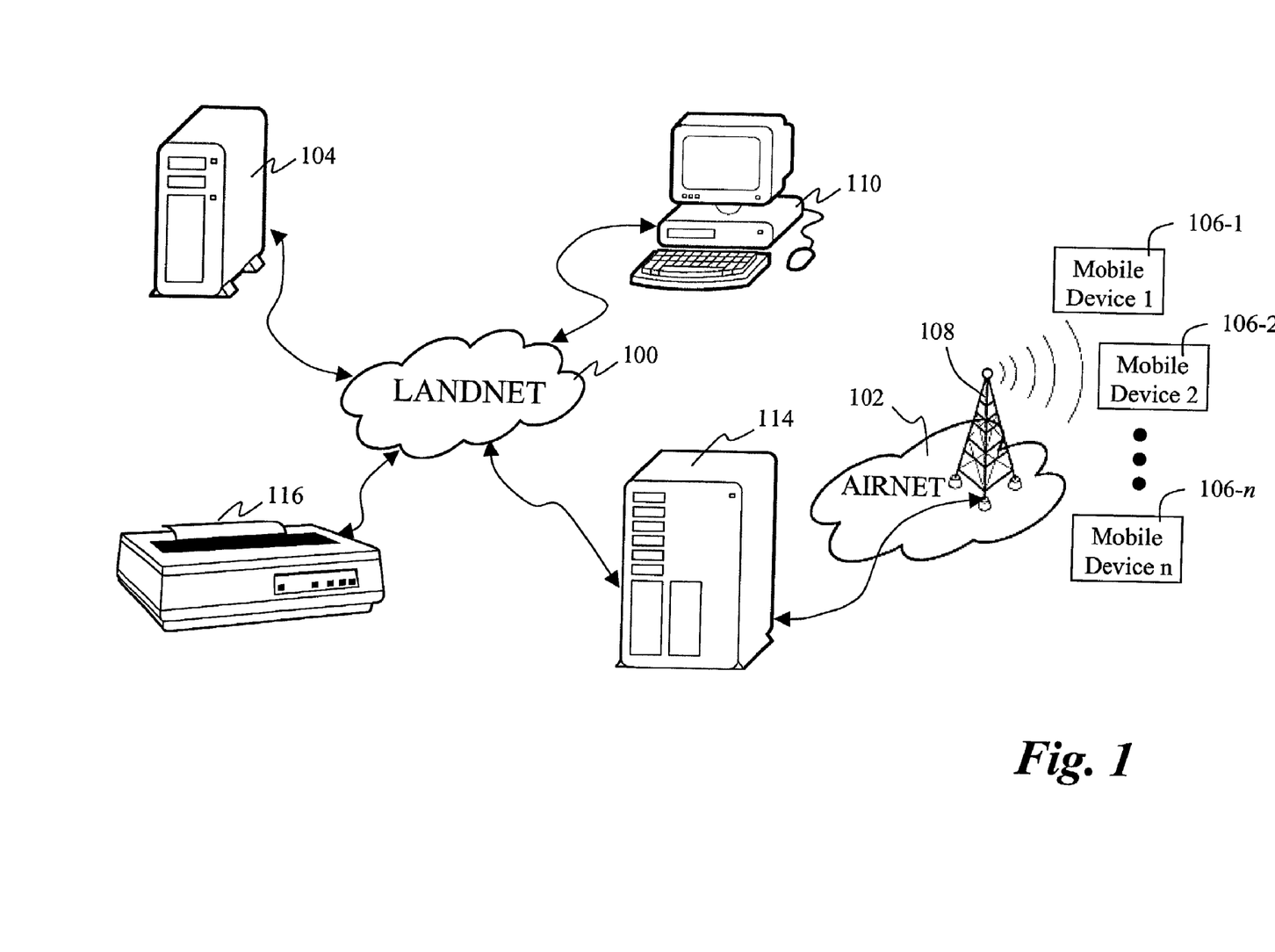
FIG. 1 shows a schematic of a network environment where embodiments of the present invention can function.

In the following discussion, in references to the drawings like numerals refer to like parts throughout the several views. FIG. 1 shows a schematic configuration of a networking environment in which the present invention can be practiced. Landnet 100 represents a landline network that may include the Internet, a local area network and a network of a private and/or a public network. Representative computer 110, network server 104 and printer 116 are shown coupled to landnet 100. Computer 110, for example, may be a personal computer operating a HyperText Markup Language (HTML) browser, such as Netscape Navigator from Netscape Communications Corporation, via landnet 100 using HyperText Transfer Protocol (HTTP) to access information stored in network server 104. Network server 104, for example, may be a workstation from SUN Microsystems Inc.

There are n mobile devices 106 (i.e. 106-1 through 106-n), each being serviced by antenna 108 via airnet 102. Mobile devices 106-1 through 106-n are interactive two-way communications devices such as, for example, mobile telephones, palm-sized computing devices, or other device capable of communicating with at least one of other devices over the networks. Antenna 108 also represents a wireless carrier infrastructure that generally comprises a base station and an operations and maintenance center. The base station controls radio or telecommunication links with mobile devices 106. In general, the operations and maintenance center includes a mobile switching center performing the switching of calls between mobile devices 106 and other fixed or mobile network users. Further, the operations and maintenance center manages mobile account services, such as authentication, and oversees the proper operation and setup of the wireless network. Each of the hardware components and processes in carrier infrastructure 108 are known to those skilled in the art.

Link server 114 couples airnet 102 to landnet 100. In general, any number of link servers can be included, coupling to any number of individual networks. Link server 114, also referred to as a proxy server, wireless data server or network gateway server, may be a workstation or a personal computer. One function performed by link server 114 is to facilitate the communication of mobile devices 106 with any device coupled to landnet 100 or airnet 102.

To facilitate the description of the present invention, the following description is based on a wireless portable device, such as a cellular phone. Those skilled in the art will appreciate that the description herein is equally applied to any mobile device that has an imaging capability according to the present invention.

Figure 2:
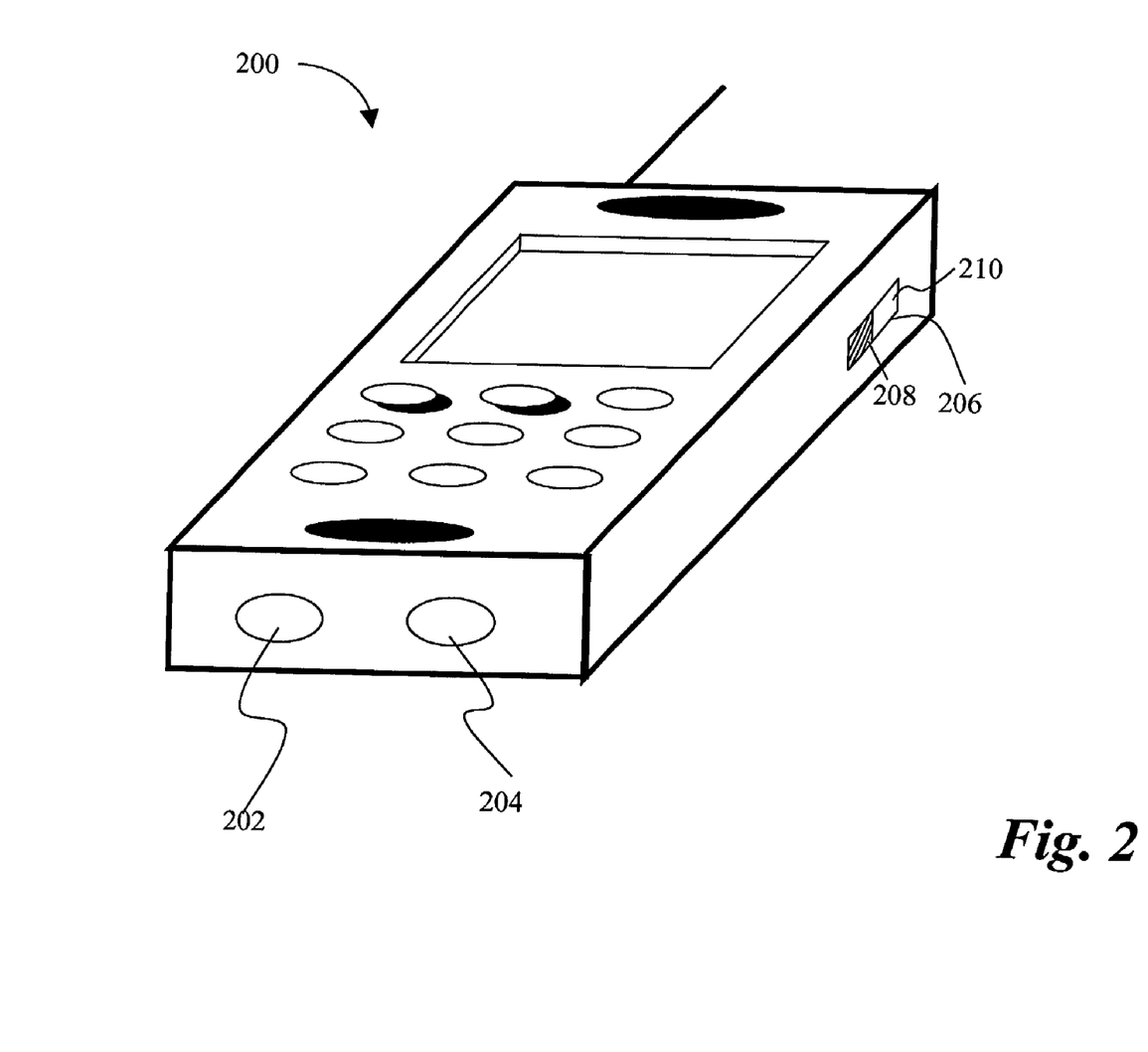
FIG. 2 depicts one example of mobile devices or specifically a wireless phone device according to the present invention.

FIG. 2 depicts one example of mobile devices or specifically a wireless phone device 200 according to the present invention. According to one aspect of the present invention, mobile device 200 can capture both natural scenic images or document images. As used herein, a natural scenic image is from a scene other than a document and includes, for example, a user of device 200 when the user is engaged in a video phone/meeting or an image of a natural scene. The natural scene image typically requires a low spatial resolution but a high intensity bit resolution, for example 320 by 240 pixels with 8-bit intensity level resolution. A document image is typically high in spatial resolution and low in intensity bit resolution, for example 1000 by 1400 pixels with 1-bit or 2-bit intensity level resolution.

A viewfinder opening 202 provides optical access for visual feedback to a user of device 200 so that the user knows when to activate the operation of image capturing upon an object being properly targeted. in one embodiment a switch mechanism 206 is controllable for switching between setting for a scene image and a document image so that the proper spatial or intensity resolutions could be set to cause an image sensor behind opening 204 to generate an appropriate image (i.e. either a higher spatial resolution/lower intensity image or a lower spatial resolution/higher intensity image).

According to another embodiment of the present invention, switch mechanism 206 includes a switch that can be manually or electronically set at position 208 or at position 210. Position 208 and position 210 are two respective positions, one for scene imaging and the other for document imaging. In other words, when switch mechanism 206 is set at position 208, an image sensor behind opening 204 is ready for producing images low in spatial resolution but high in intensity bit resolution, referred to herein as low spatial/high bit resolution image(s). When switch mechanism 206 is set at position 210, the image sensor is ready for producing images high in spatial resolution but low in intensity bit resolution, referred to herein as high spatial/low bit resolution image(s). According to yet another embodiment, switch mechanism 206 also allows the user to initiate or trigger an image capture. It should be noted that switch mechanism 206 is not necessarily a separate switch and can be indeed assigned or electronically mapped to one of the keys in the keypad of mobile device 200, the keypad in some embodiments of mobile device 200 may be displayed icons or soft keys that can be activated by a physical touch. It is now evident to those skilled in the art that other mechanisms (e.g. via voice commands) may be used to control the setting of switch mechanism 206 so that a proper image may be generated.

As will be appreciated from further description of the invention, switch mechanism 206 would not function as advantageously as one would expect if a regular image sensor, such as those currently and commercially available CCD or CMOS image sensors, was used. Those CCD or CMOS image sensors output image, by default, in a fixed resolution and the images therefrom would have to be post-processed If the feature in the present invention is desired. The controllable resolution feature in the present Invention is achieved through a controllable and programmable readout mechanism in accordance to a setting that causes the image resolutions to change accordingly in the digital pixel sensor employed in a mobile device.

Figure 3A:
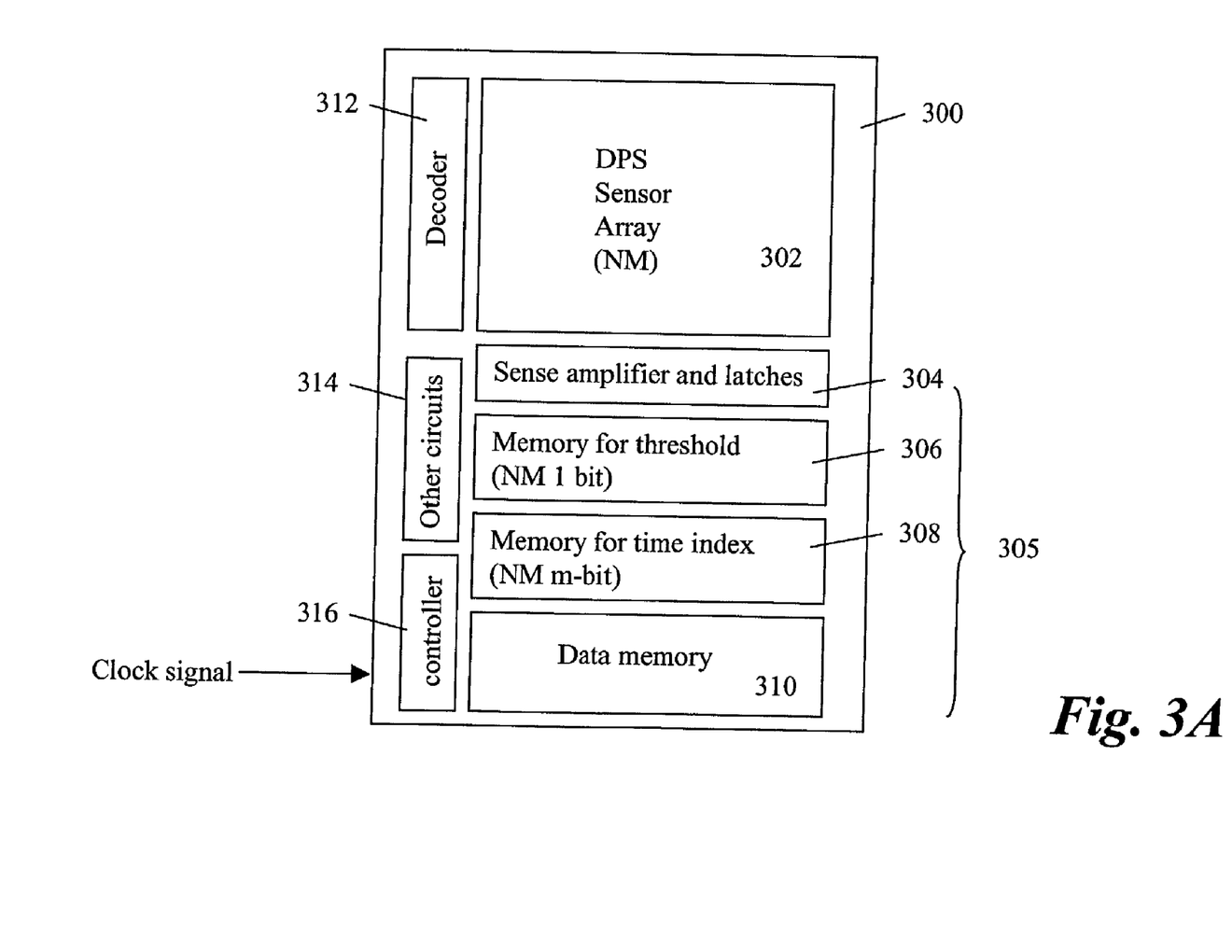
FIG. 3A shows an image sensor based on a digital pixel sensor (DPS) architecture and preferably used in the mobile device of FIG. 2.

Referring to FIG. 3A, there is shown an image sensor 300 based on a digital pixel sensor (DPS) architecture and preferably used in mobile device 200 of FIG. 2. The sensor array 302 comprising DPS elements as detailed in FIG. 3B outputs digital signals representing one or more images of a scene, which is significantly different from the conventional CCD or CMOS image sensors that output analog signals. As understood by those skilled in the art, the different format of the outputs from the DPS image sensor and the conventional image sensors is neither trivial nor obvious.

Figure 3B:
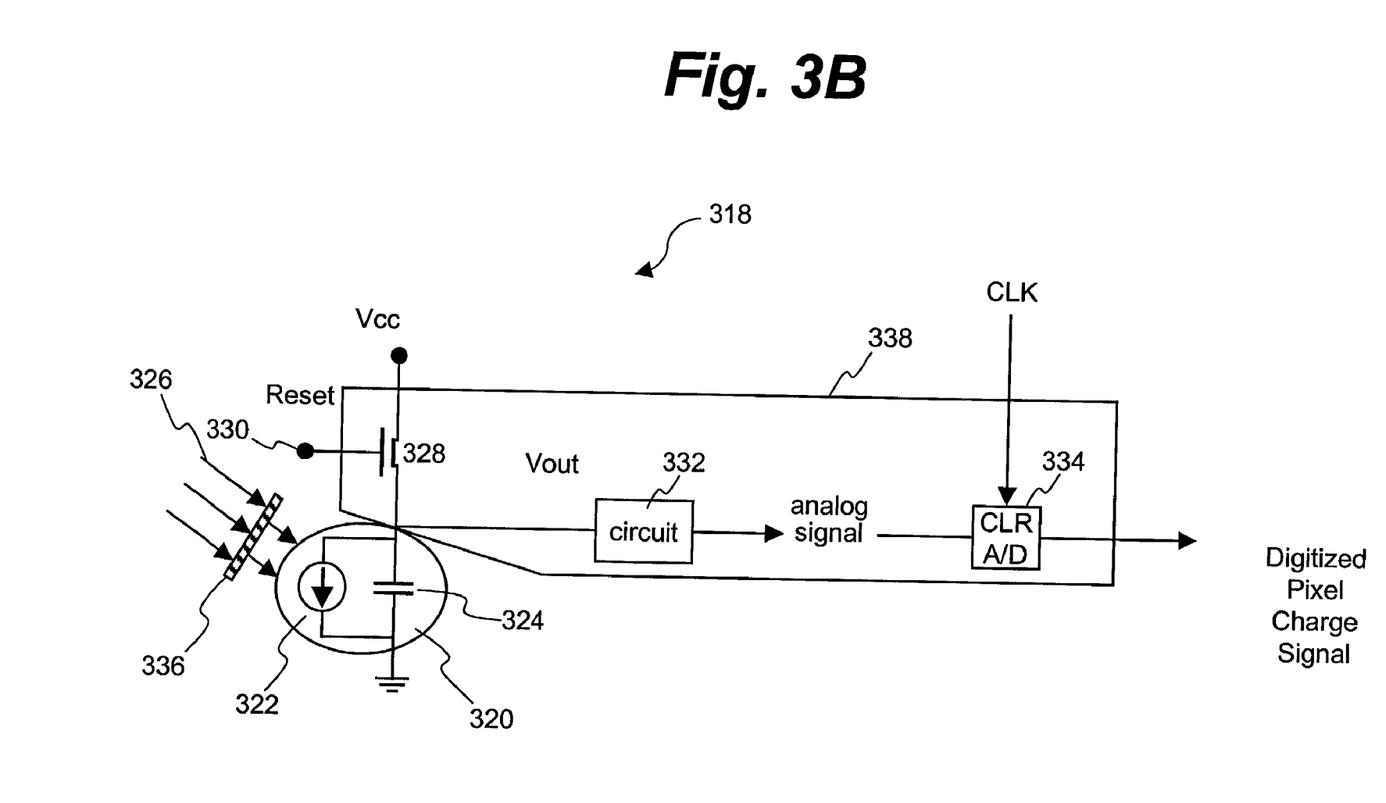
FIG. 3B shows a circuit diagram illustrating functions of a DPS element used in a digital pixel sensor according to one embodiment.

Referring now to FIG. 3B, there is shown a circuit diagram illustrating functions of a DPS element 318 used in digital pixel sensor 302 according to one embodiment. Different from a conventional pixel element that is primarily a photosensor, DPS element or pixel element 320 includes a photosensor 320 (e.g., a photodiode) and pixel supporting circuitry 338. Photosensor 320 may be represented as a current source 322 in parallel with a capacitor 324. Photosensor 320 is coupled in series with the source and drain of transistor 328 and the combination of photosensor 320 and transistor 328 is coupled between a voltage $V_{cc}$ and ground. Gate 330 of transistor 328 is coupled to receive a reset signal. When the reset signal to gate 330 is reset (e.g., to a high), transistor 328 is on, capacitor 324 is charged to $V_{cc}$ less the threshold voltage $V_{th}$ of transistor 328. Then the reset signal is set (e.g., a low now) to turn transistor 328 off. Capacitor 324 then discharges through current source 322.

Current source 322 discharges capacitor 324 at a rate dependent on the number of photons striking photosensor 320. Photons from light 326, focused by filter 336, are incident on photosensor 320. The voltage across capacitor 324 is dependent on the total number of photons that strike photosensor 320. A voltage output signal $V_{out}$, which is the voltage across capacitor 324, is indicative of the integrated light intensity between the time that transistor 328 is turned off and the time that light 326 incident on photosensor 320 is turned off.

Circuit 332 is coupled to receive the voltage output signal $V_{out}$ from capacitor 324. Circuit 332 enhances the voltage output signal $V_{out}$ to create a pixel charge signal. The pixel charge signal is an enhanced voltage output signal suitable for coupling to following analog-to-digital conversion circuitry 334. It should be noted that circuit 332 is not necessary in some embodiments. Depending on an exact implementation, the use of circuit 332 may sometimes increase the sensitivity of pixel 320.

Analog-to-digital conversion circuitry 334 is coupled to receive the pixel charge signal (i.e., an analog signal) from circuit 332 and convert the analog signal when triggered by the CLK signal to produce a digitized pixel charge signal. Examples of analog-to-digital conversion circuitry 334 may include a regular well-known A/D converter or bit-serial analog-to-digital conversion circuit disclosed in co-pending U.S. patent application Ser. No. 09/274,202, entitled "Methods for Simultaneous Analog-to-Digital Conversion and Multiplication", which is hereby incorporated by reference in its entirety. One of the advantages of digitizing the pixel charge signal within DPS element 320 is that a digitized pixel charge signal can be read out at much higher speeds than can a corresponding analog signal from a traditional photosensor. Further, since each of the pixel elements in sensor array 302 can output digital signals at the same time and the digital signals can be read out in parallel (e.g. in a row or column fashion), the clocking signal to support the readout thus could be relatively low without compromising the readout speed. As a result, the power consumption of the sensor array 302 is relatively lower comparing a conventional CMOS image sensor for the same data readout speed.

It should be noted that element 320 in FIG. 3B is an exemplary implementation of a DPS element. In one embodiment, analog-to-digital conversion circuitry 334 is shared by a group of neighboring pixels (e.g. 4 photosensors) to reduce the actual size of an image sensor.

Referring back to FIG. 3A, sense amplifier and latches 304 are coupled to the digital pixel sensor 302 to facilitate the readout of the digital signals from the digital pixel sensor 302. In addition, sensor 300 includes memory 305 that is virtually partitioned as memory 306 (referred to herein as threshold memory) for storing threshold values, memory 308 (referred to herein as time index memory) for storing time index values, and digital or data memory 310 that is large enough to accommodate a frame of image data from sensor 302. The detailed description of operations of the memories 306, 308 and 310 is provided in U.S. application Ser. No. 09/1567,786.

As a result of the above memory configuration, each of the pixel elements in sensor array 302 can be associated with each of the memory cells in the threshold memory 306, the time index memory 308, and the data memory 310.

Figure 3C:
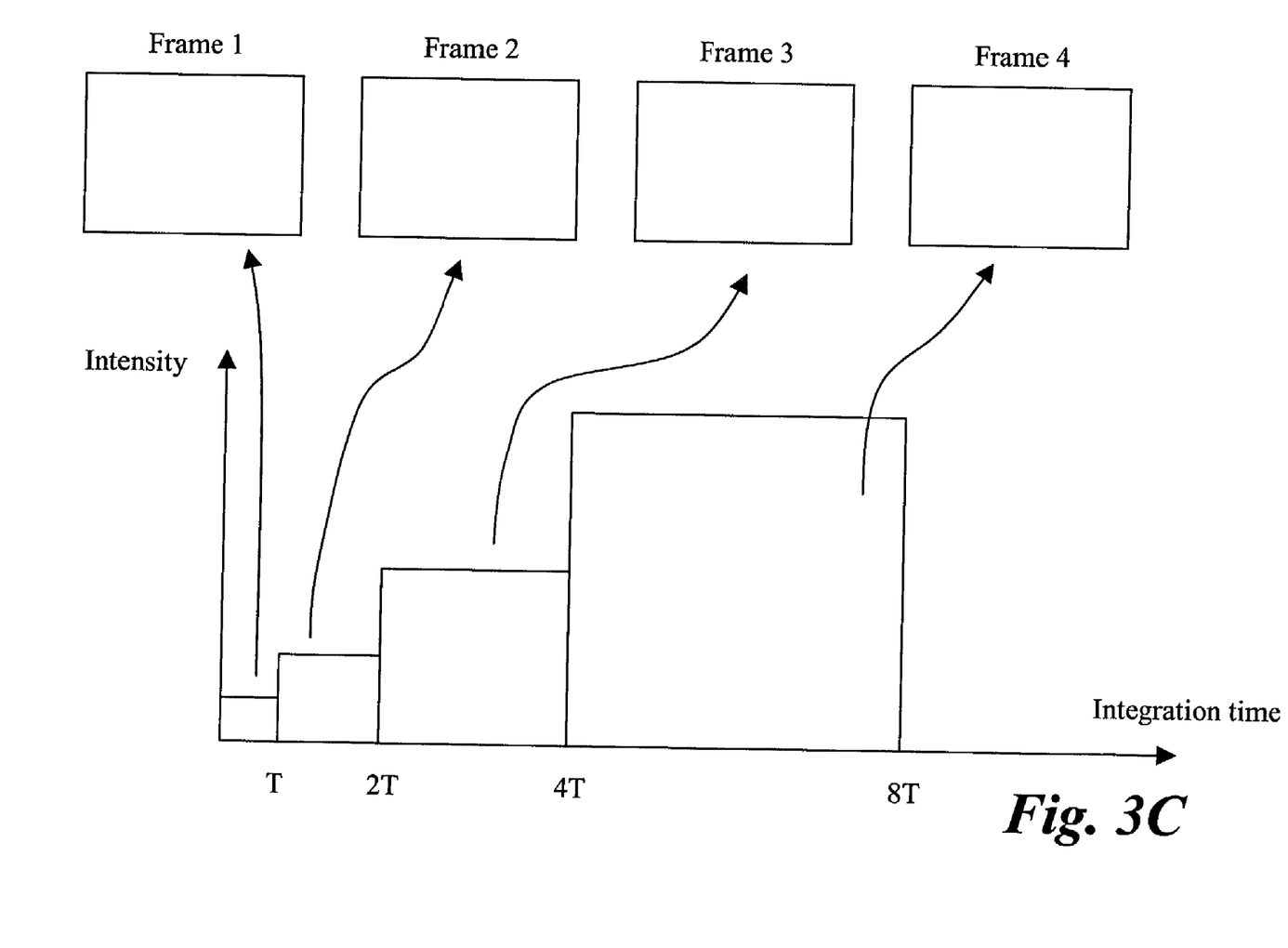
FIG. 3C shows an example of an over-sampling of an image or multiple exposures of a scene.

In operation, at each of the time indexes, for example, T, 2T, 4T and 8T, sensor array 302 is read out (e.g. four times), resulting in four images at four different exposure times. In other words, a scene being imaged by sensor 300 is multiple sampled by sensor array 302 given a predefined exposure time. FIG. 3C shows an example of the multiple exposures. As shown in FIG. 3C, frame 1 is created after time T, frame 2 is created after time 2T, frame 3 is created after time 4T, and frame 4 is created after time 8T. One of the advantages of having multiple images of the same target within an exposure time is the ability to expand the dynamic range of the image captured as pixel values in each of the frames can be selectively read into data memory 310 in accordance with threshold memory 308. Because of the relative short exposure time, frame 1 typically captures information that is related to high illumination areas in the target. Likewise, because of the relatively long exposure time, frame 4 typically captures information that is related to low illumination areas in the target. Frame 2 and frame 3 thus capture information that is related to gradually increased illumination areas in the target. As a result, the combination of the multiple images with respect to the time index memory provides a very wide dynamic range.

In operation, a snapshot of a scene to be read out multiple times at different times prevents the photodetectors in the sensor array from being saturated. When a value in the threshold memory detects that a corresponding photodetector is saturated, the value from the corresponding photodetector in subsequent frames will be prevented from writing into the data memory. The feature is very important to the mobile image acquisitions in dynamically changed lighting conditions and demonstrates a significant departure from the conventional image sensor.

Memory 305 or data memory 310 is essentially a RAM and can be randomly accessed for different purposes. One of the purposes is to read the data out in different resolutions to accommodate different applications over the Internet without compromising the image quality. According to one embodiment, the way image data in data memory 310 is read out is controlled by a set of parameters that may be embedded in controller 316 or circuits 314. For example, when the position of switch mechanism 206 of FIG. 2 is at position 208, a first set of parameters is effective and causes the data to be readout in a decimating fashion, namely the spatial resolution is reduced. Likewise, when the position of switch mechanism 206 of FIG. 2 is at position 210, a second set of parameters is effective and causes the data to be extracted from one or more bit planes of data, namely the intensity resolution is reduced. The detailed operation of the bit plane data readout is provided in U.S. patent application Ser. No. 09/638,502, entitled "Implementation of Pixel Normalization in a Digital Pixel Sensor", which is incorporated herein by reference.

Figure 3D:
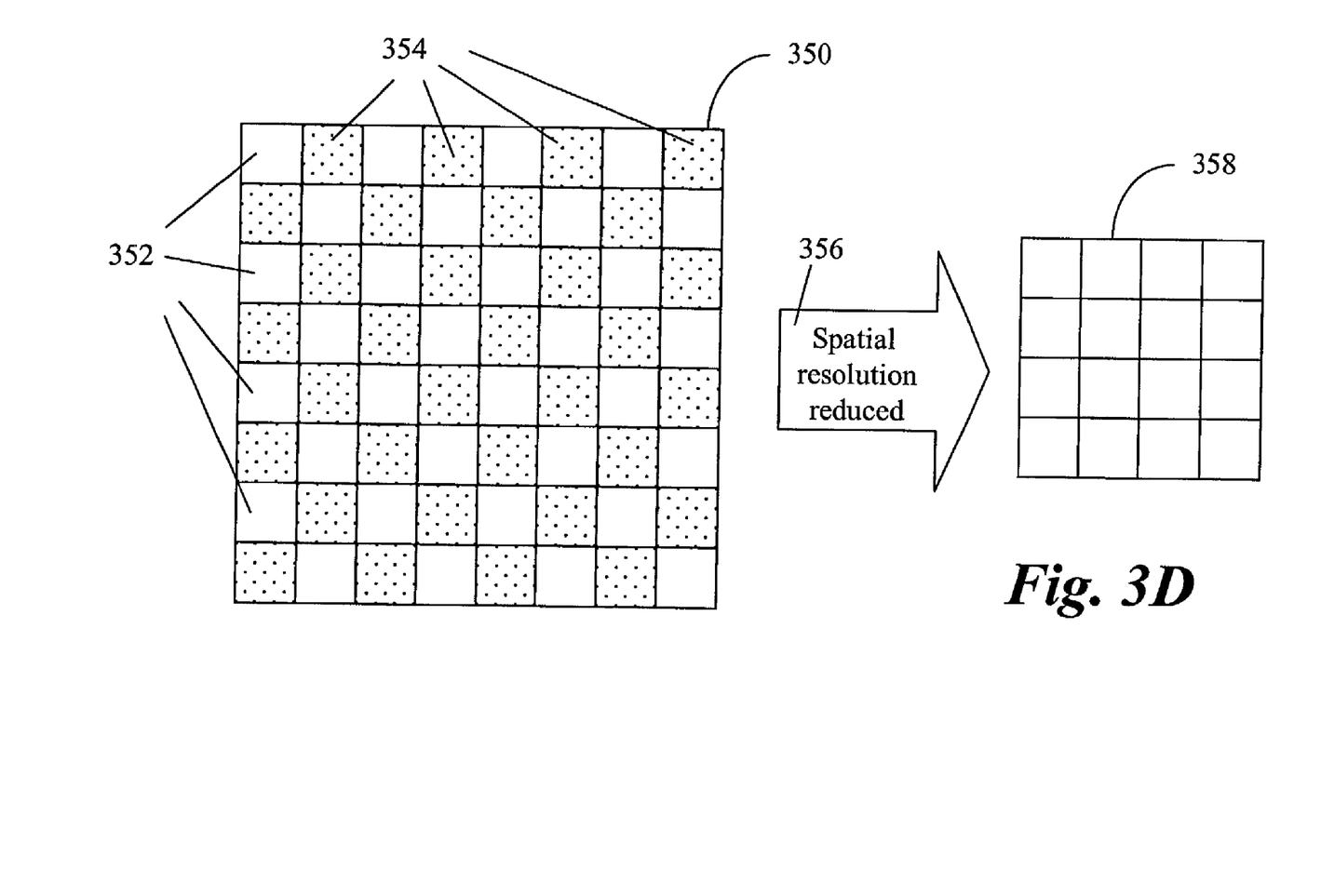
FIG. 3D illustrates the concept of the spatial resolution reduction process.

According to one embodiment of the present invention, FIG. 3D illustrates a spatial resolution reduction process. Pixel data structure 350 is representative of a part of data memory 310. Each of the blocks 352 and 354 in data structure 350 represent one pixel value produced from the pixel element in sensor array 302. The pixel value may be in 8-bit or more precision. As an example, for a scene image, a readout circuit 356 may be configured to readout the pixel values in every other block so as to reduce the spatial resolution by a factor of 2. As a result, an image 358 readout from data memory 310 is suitable as a scene image.

Figure 3E:
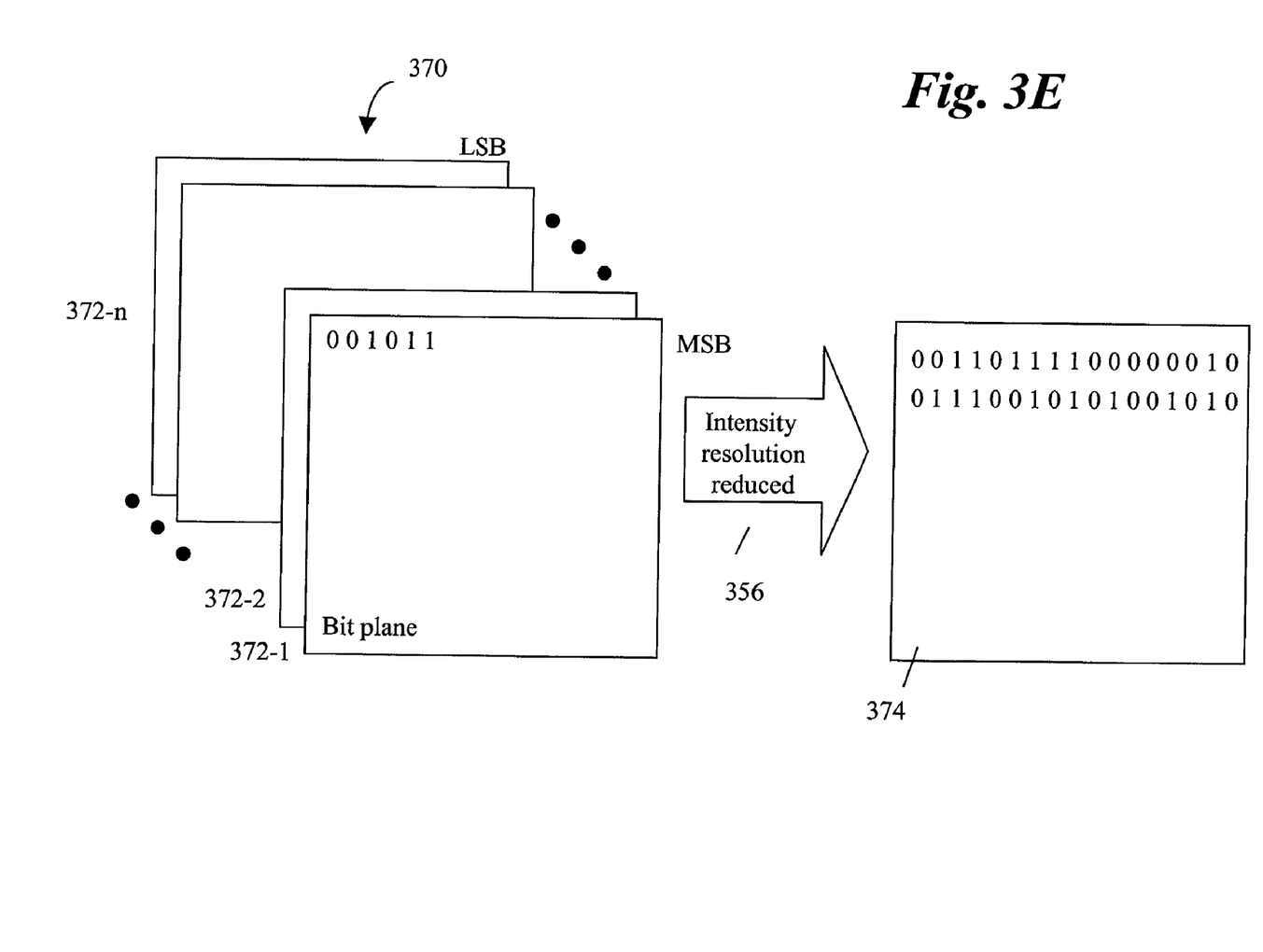
FIG. 3E shows a set of bit planes representing a part of data memory.

Likewise, FIG. 3E shows a set of bit planes representing a part of data memory 310. Each of the planes 372 (i.e. 372-1 to 372-n) represents a bit plane in an image. For example, the image is 8-bit precision, there will be 8 planes, hence plane 372-1 is a most significant bit (MSB) plane and plane 372-8 is a least significant plane (LSB). For document images, a readout circuit 356 can be configured to readout a MSB plane only to represent a binary image 374. There may be other ways to readout the bit planes to generate images with less intensity resolutions.

It deems necessary to state that the flexibility of the readout mechanism is achieved solely in the image sensor architecture 300 that makes it possible to reduce the cost, increase the imaging performance, and minimize the power consumption of the mobile device.

Given the description, the implementation of such readout mechanism is evident to those skilled in the art. The implementation can be in hardware, software or a combination of both. The details of various implementations are not to be described herein to avoid obscuring the scope of current invention.

Figure 4:
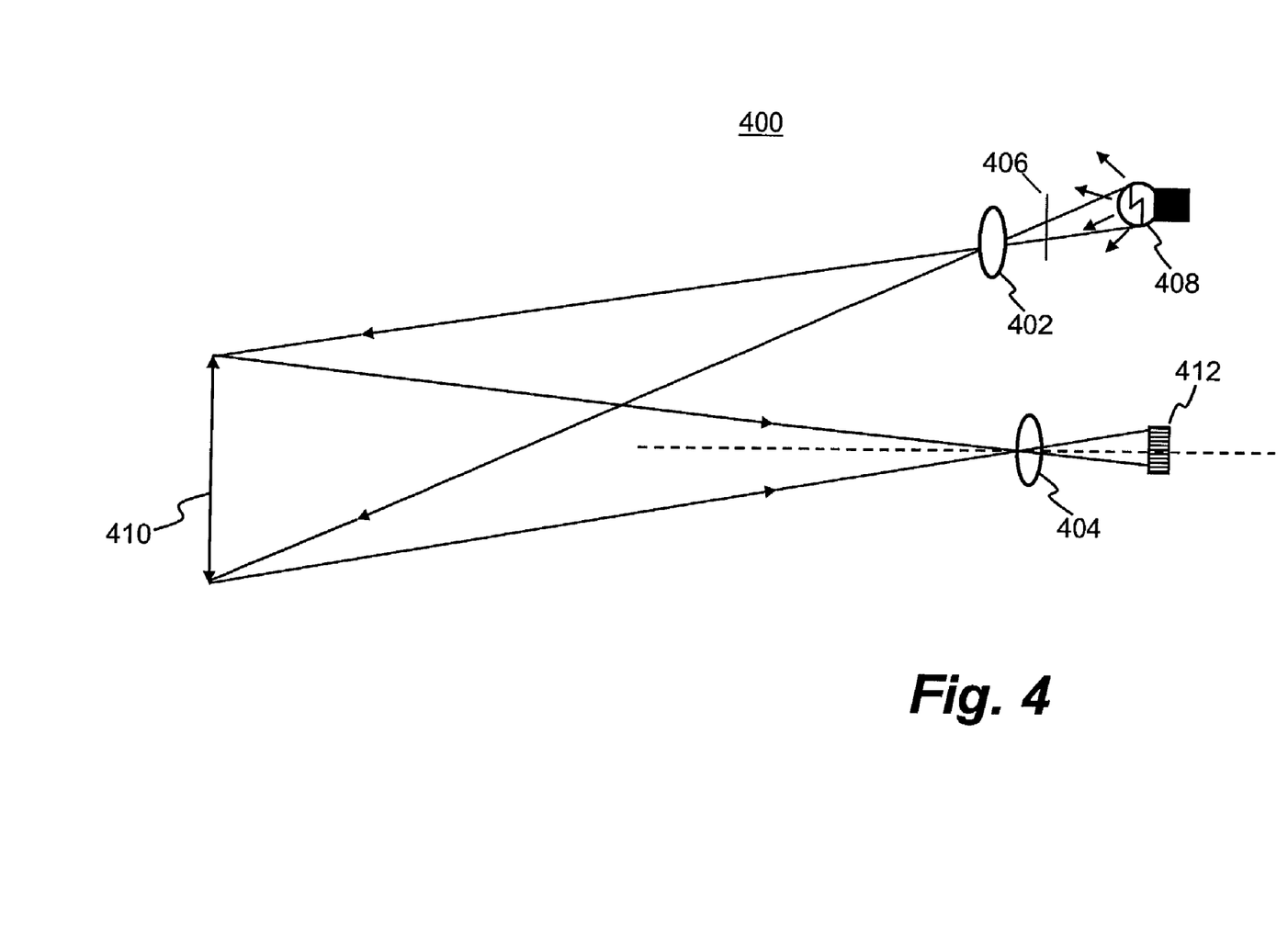
FIG. 4 illustrates an optical diagram used together with the image sensor of FIG. 3A according to one embodiment of the present invention.

For completeness, FIG. 4 illustrates an optical diagram 400 according to one embodiment of the present invention. Lenses 402 and 404 are situated, respectively, in openings 202 and 204 and are integrated with mobile device 200 of FIG. 2. In some embodiments, lenses 402 and 404 are respectively placed at openings 202 and 204. In other embodiments, lenses 402 and 404 may be placed respectively behind opening 202 and 204. The exact location of lenses 402 and 404 as well as switch mechanism 206 does not affect the operation of the present invention.

Integrated with lens 402, there are a template 406 and a light source 408. The template, being optional, can cause the illumination from light source 408 to form a pattern so that a user knows if the sensor behind opening 204 is aimed at a target being imaged. According to one embodiment, template 406 is used to construct a structured light pattern visible to the user. For example, when target 410 is a document, the light pattern can be a light sheet. The size of the projected light sheet through lens 402 is so designed that it approximately covers the document. Alternatively, the light pattern may be a set of boundary lines, corner spots and the like to indicate how the document is positioned relative to mobile device 200. When target 410 is a natural scene, the light pattern can be a spot to show where the image sensor is focused. Alternatively, template 406 can be controlled by switch mechanism 206 in FIG. 2.

Light source 408 can include one or more LEDs (Light Emitting Diodes). Light source 408, however, can be any visible light source, preferably a type of low power consumption. Lens 404 is so positioned that when scene 410 is appropriately illuminated by source 408, light from scene 410 is focused right onto image sensor 412 (e.g. image sensor 300 of FIG. 3A).

Figure 5:
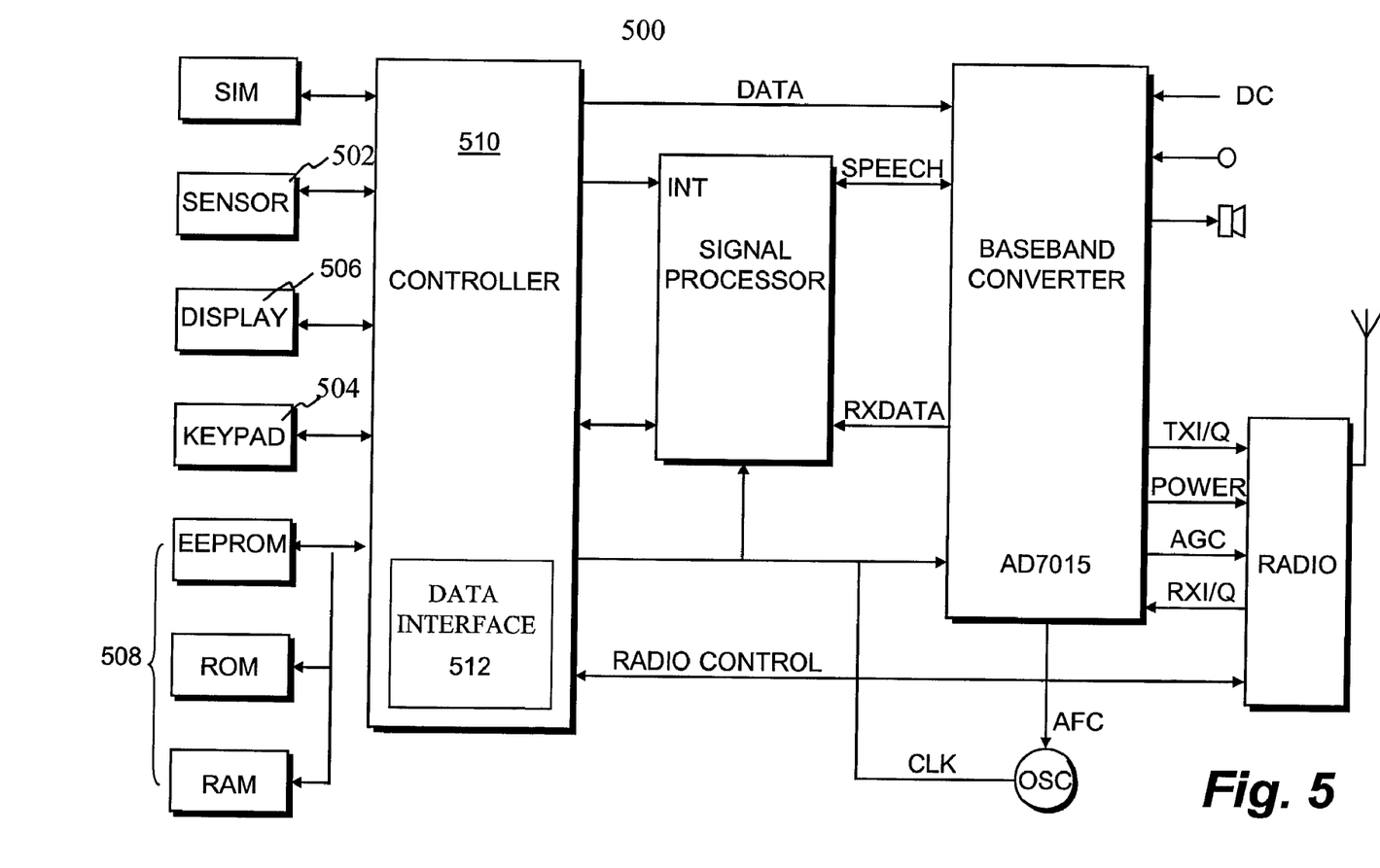
FIG. 5 shows a function block diagram of a mobile device according to one exemplary implementation.

FIG. 5 shows a functional block diagram 500 of a mobile device according to one exemplary implementation. One of the features in the mobile device is the employment of image sensor 502 that is based on the architecture 300 of FIG. 3A. Through one of the keys in a keypad 504, a user of the mobile device is able to control what resolution an image should be generated by sensor 502. When the image is obtained from the image sensor or received from the network, the user has an option to view the image on a display screen 506. Memory 508 is used to store various applications. One of the applications is for compressing images. To increase the efficiency of transmission over a data network, the images generated by image sensor 300 is preferably compressed. All operations of the components in FIG. 5 are synchronized and controlled by controller 510. In addition, a data interface 512 is employed to manage the assembling of an image file into smaller packets that are transmitted over the data network and reassemble received packets into the original image file. One of the common protocols used in the data interface 512 is TCP/IP (Transmission Control Protocol/Internet Protocol) commonly used in the Internet.

The advantages of the invention are numerous. Different embodiments or implementations as a method, a system and an apparatus may yield one or more of the following advantages. One advantage of the invention is that now a mobile device equipped with a digital image sensor can take pictures in very dynamically changed lighting conditions. Another advantage is the low power consumption of the unique sensor architecture so that the mobile device would not experience significant power drainage from the sensor. Still another advantage of the invention is that the images can be read out in a desired spatial resolution or a desired intensity resolution depending on the nature of the imaging target.

Many other features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be considered to fall within the scope of the invention.

We claim:

1. A mobile device comprising:
   an image sensor producing digital signals representing a target when the image sensor is activated, the image sensor including an array of pixel elements, each of the pixel elements including a photodetector and an analog-to-digital conversion circuit, the photodetector producing an analog signal, the analog signal being converted to one of the digital signals;
   a data memory to receive and store the digital signals, wherein memory cells in the data memory can be accessed randomly through a readout mechanism so that the digital signals can be selectively read out of the data memory;
   a switching mechanism, the switching mechanism controlling the readout mechanism so that the digital signals is read out of the data memory in one of a plurality of predefined ways, a first one of the plurality of predefined ways comprising reading out only one or a few of the bit planes representing the digital signals so that a resultant image is a density reduced image and a second one of the plurality of predefined ways comprising reading the digital signals out in a decimation fashion so that a resultant image is a spatially reduced image; and
   a data transmission circuit coupled to the data memory and receiving the digital signals therefrom, the digital signals being converted to data that are transmitted over a network.

2. The mobile device of claim 1, wherein the switching mechanism is externally integrated so that it is accessible by a user of the mobile device.

3. The mobile device of claim 2 further comprising a keypad including a plurality of keys, one of the keys being configured to act as the switching mechanism.

4. The mobile device of claim 2 further comprising a display displaying a plurality of icons or soft keys, one of the icons or soft keys being configured to act as the switching mechanism.

5. The mobile device of claim 1, further comprising a compression circuit coupled to the data memory, the compression circuit compressing the digital signals to produce compressed data.

6. The mobile device of claim 5 wherein the data transmission circuit includes a network interface that converts the compressed data into packets for transmission over the network.

7. The mobile device of claim 1, wherein the mobile device is selected from a group consisting of a cellular phone, a PDA, and a handheld computing device.

8. The mobile device of claim 1 further comprising a display screen that can display the digital signals when a user of the mobile device desires.

9. The mobile device of claim 1 further comprising a light source to illuminate a target being imaged.

10. The mobile device of claim 9 wherein the light source projects a structured light so that a user sees if the target is aimed or focused properly.

11. A mobile device comprising:
    an image sensor including digital pixel elements and a data memory, the digital pixel elements coupled to the data memory and producing a predefined number of frames of digital signals when the image sensor is activated to expose to a target for a predefined time;
    wherein each of the frames is read out of the digital pixel elements respectively and pixel values in each of the frames are selectively written into the data memory;
    a switching mechanism, the switching mechanism controlling the read out operation of the data memory so that the digital signals is read out of the data memory in one of a plurality of predefined ways, a first one of the plurality of predefined ways comprising reading out only one or a few of the bit planes representing the digital signals so That a resultant image is a density reduced image, and a second one of the plurality of predefined ways comprising reading the digital signals out in a decimation fashion so that a resultant image is a spatially reduced image; and
    a data transmission circuit coupled to the data memory and converting the pixel values in the data memory to data packets for data transmission transmitted over a network.

12. The mobile device of claim 11 wherein the data transmission circuit includes a network interface executing at least one data communication protocol.

13. The mobile device of claim 12 wherein the at least one data communication protocol is TCP/IP or UDP/IP.

14. The mobile device of claim 12 further comprising a compression circuit coupled to the data memory, the pixel values in the data memory are compressed before being converted to data packets in the network interface.

15. The mobile device of claim 11, wherein the mobile device is capable of communicating wirelessly in the network.

* * * * *